Oct. 17, 1967  J. ROUILLARD ET AL  3,347,111
ARTICULATION DEVICES WITH TRANSMISSION OF MOVEMENTS
Filed April 23, 1964  2 Sheets-Sheet 1

Oct. 17, 1967  J. ROUILLARD ETAL  3,347,111
ARTICULATION DEVICES WITH TRANSMISSION OF MOVEMENTS
Filed April 23, 1964  2 Sheets-Sheet 2

United States Patent Office 3,347,111
Patented Oct. 17, 1967

3,347,111
ARTICULATION DEVICES WITH TRANSMISSION OF MOVEMENTS
Joseph Rouillard and Jean Vertut, Paris, France, assignors to Commissariat a l'Energie Atomique, Paris, France
Filed Apr. 23, 1964, Ser. No. 361,997
Claims priority, application France, May 10, 1963, 934,492
1 Claim. (Cl. 74—501)

The present invention relates to articulation devices which provide transmission of movement by means of either cables, belts or chains.

There exist many examples of such devices in which it proves a matter of difficulty to design supports for the aforesaid cables, belts or chains so that the length of these latter is maintained constant at the time of displacement of an articulation, and this problem has been partially solved by relating the movements of two articulations in such manner that, during their displacements, any variations in the length of said cables, belts or chains are mutually compensated.

The object of the invention is to make the above-mentioned devices such that they meet practical requirements more effectively than has hitherto been achieved, particularly insofar as they offer a precise solution to the problem outlined above by permitting the possibility of articulating two arms while ensuring that the displacement of said articulation is in no way liable to produce any variation in length of the transmission or in the tension of the cables, belts or chains, both at the time of an angular displacement and/or telescopic movement of one of the arms, these features being combined in a single compensating device in accordance with the present invention.

The invention consists of two members mounted for telescopic movement relative to each other and two separate parallel arms each articulated to one of the members, the parallel relation of said two arms being maintained by means of a shaft which is associated in translational motion with said arms and by suitable means transmitting angular movements to said arms at the time of their angular displacements.

Aside from this main arrangement, the invention further consists of certain other arrangements which are preferably employed at the same time and which are to be considered either separately or in any operative combinations thereof, namely:

In FIGURES 1 and 2 the pins which provide articulations between said two arms respectively and said two members are each fitted with at least one freely mounted pulley or so-called "articulation pulley," each of said two members terminates on at least one freely mounted pulley or so-called "end pulley," and the parallel relation of the two members is ensured by means of a trolley which is movable in translational motion on said two members, said trolley being fitted with an axle-pin on which so-called "idler pulleys" are mounted to rotate freely, the transmission of movements being carried out by means of at least one cable which is passed successively over a first-articulation pulley, an end pulley of the first member, one of the idler pulleys, and a second-articulation pulley, the compensation action being produced by at least one cable secured to at least one pulley which is integral with said first arm and which is mounted on the pin of the first articulation, said cable being adapted to pass in the direction opposite to the preceding over a pulley which is secured to the axle-pin of the trolley, over a freely mounted end pulley of the second member, said cable being secured to at least one pulley which is integral with said second arm;

In FIGURE 3 the pins which provide articulations between said two arms respectively and said two members are each fitted with at least one freely mounted pulley or so-called "articulation pulley," the first of said two members terminates on at least one freely mounted pulley or so-called "end pulley," and the parallel relation of said two members is ensured by means of a toothed pinion which cooperates with two racks arranged at the ends of each of said two members, the transmission of movements being carried out by at least one cable which passes successively over a first-articulation pulley and an end pulley of the first member, the shaft of said toothed pinion, and a second-articulation pulley, the compensation being carried out by two toothed pinions which are integral with said two arms at the points of articulation and which cooperate with two other racks carried respectively by said two members in the vicinity of said two points of articulation.

The invention finally consists of a remote handling appliance entailing the application of at least one of the arrangements noted above.

A better understanding of the invention will in any case be obtained from the complementary description which now follows and from the accompanying drawings, said complementary description and said drawings being of course given solely by way of indication and not in any limiting sense.

Figure 1:
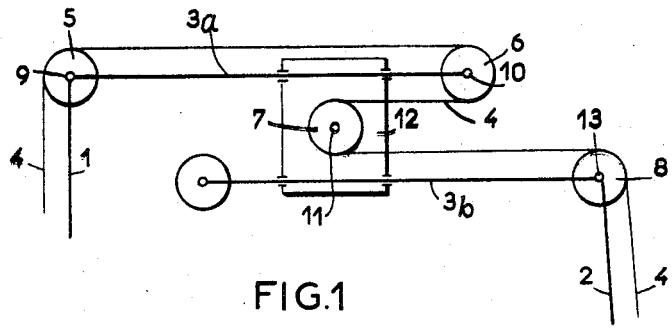
FIG. 1 is a diagram of the path followed by a cable for the transmission of movements in an improved device in accordance with the invention.

Reference being made to FIG. 1, it will be assumed that two arms 1 and 2 are capable of angular displacements and are coupled together by means of an assembly of two members 3a and 3b which is capable of performing a telescopic movement. A cable 4, for example, will have the assigned function of transmitting a movement along this articulated assembly and is designed to bear on the pulleys 5, 6, 7 and 8 which are mounted to rotate freely on their respective axle-pins located as specified hereinafter. The axle-pin 9 is located at the point of articulation of the arm 1 and of the members 3a, the axle-pin 10 is located at the other end of the member 3a, the axle-pin 11 is located on a trolley 12 which is slidably mounted on both members 3a and 3b so as to maintain these latter in parallel relation, and the axle-pin 13 is located at the point of articulation or pivotal attachment of the member 3b to the arm 2. It will therefore be apparent that any tractive effort applied on the cable 4 will initiate the displacement of the trolley 12.

Figure 2:
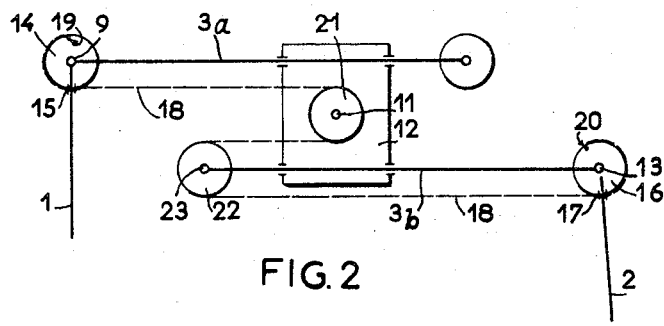
FIG. 2 is a diagram of the device for providing compensation by cables, belts or chains in accordance with the invention.

Reference being made to FIG. 2, in which the arms 1 and 2, the members 3a and 3b, the articulations 9 and 13 as well as the trolley 12 are again shown, the description which now follows will explain the manner in which said trolley is continuously maintained in position so that the tension of the transmission cable 4 remains constant irrespective of the relative movements of the arms 1 and 2 in the same plane, including the telescopic movements of the assembly 3a–3b. Provision is made at the point of articulation 9 for a pulley 14 which is mounted on the same axle-pin as the pulley 5 but which is integral at 15 with the arm 1. Similarly, provision is made at the point of articulation 13 for a pulley 16 which is mounted on the same axle-pin as the pulley 8 but which is integral at 17 with the arm 2. The compensating cable 18 is intended to be secured at 19 to the pulley 14 and at 20 to the pulley 16 and to pass successively and in the directions indicated in FIG. 2 over a freely mounted pulley 21 which is carried by the trolley 12 and which is mounted on the same axle-pin 11 as the pulley 7 and over a freely mounted pulley 22, the axle-pin 23 of which is placed at the non-articulated extremity of the member 3b.

Reference being made to both FIGS. 1 and 2, consideration will now be given to the total length of the two cables 4 and 18 from articulation 9 to articulation 13, that is to say without taking into account those two portions of cable 4 which are carried by the arms 1 and 2. This total length is equal to one half-turn over the pulleys 16 and 14 (of equal diameter), one half-turn over the pulley 6, one half-turn over the pulleys 7 and 21 (of equal diameter), one half-turn over the pulleys 8 and 16 (of equal diameter) plus twice the lengths of the members 3a and 3b. It will therefore be understood that the sum of the lengths of the transmission cable and of the compensating cable is constant, irrespective of the relative angular position of the arms 1 and 2 and of the distance between the articulation points 9 and 13. Since the compensating cable 18 has a constant length by definition, it accordingly follows that the length of the transmission cable 4 which is applied to the articulation is also constant; thus the angular displacements between the arms 1 and 2 as well as the varations in distance between the articulations 9 and 13 have been compensated simultaneously by means of a single device.

As is self-evident, the above reasoning pre-supposes that the transmission cables, which can be provided in any required number, are continuously tensioned so as to act in opposition to the compensating cables, the number of which can be greater than one and which are also under continuous tension. If the tension of the transmission cables were to become zero or if the efforts applied to the points 9 or 13 where to produce relative displacements of these two points which would be liable to result in abnormal tension of the compensating cable, a second compensating cable acting in opposition to the cable which has just been described could accordingly be added. The second cable just referred to would follow exactly the same path as the transmission cable 4 and would be fixed on the pulleys 14 and 16 in the same manner as the cable 18 but in the reverse direction.

Figure 3:
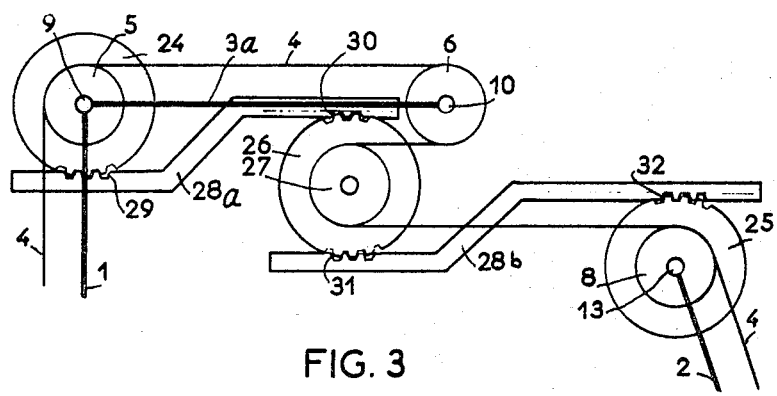
FIG. 3 is a diagram of the device for providing compensation by means of a rack and pinion system in accordance with the invention.

Reference being made to FIG. 3, a description will now follow in connection with an alternative form of the device which has been described above, wherein the two-directional compensation which has just been considered is carried into effect, not by means of a double compensating cable but by means of a set of racks and pinions.

There are again shown in this figure the arms 1 and 2, the member 3a, the transmission cable 4 which is adapted to pass over the pulleys 5, 6 and 8 and the articulation points 9 and 13. The compensation system makes use of three toothed sectors. The first sector 24 is integral with the arm 1, the second sector 25 is integral with the arm 2 and the third sector 26 is integral with the pulley 27 over which also passes the transmission cable 4. The member 28a which is parallel to the member 3a comprises on the one hand a rack 29 which engages with the toothed sector 24 and on the other hand a rack 30 which engages with the toothed sector 26. The member 28b, which is identical with the member 28a, comprises on the one hand a rack 31 which engages with the toothed sector 26 at a point of said sector which is diametrically opposite to the point of engagement of the rack 3a and, on the other hand, a rack 32 which engages with the toothed sector 25. The following part of the description will now explain the manner in which this rack and pinion system effects the compensation in the length of the movement-transmission cable 4 in respect of all the relative unitary movements of the arms 1 and 2 in the same plane. It will be assumed that the arm 1 is stationary and that the arm 2 moves parallel to itself, whereas the articulation 13 moves on a line parallel to the member 3a. During this movement, the toothed sector 26 which rolls at the same time in the racks 30 and 31 will move over one-half the distance of displacement of the articulation 13. Since the transmission cable between the pulleys 6 and 8 also passes over the pulley 27 which is integral with the toothed sector 26, it can thus be seen that the above-mention displacement of the toothed sector 26 over one-half the distance of displacement of the articulation 13 will result in precise compensation since two lengths of the cable 4 pass over the pulley 27. If one now considers an angular displacement of the arm 2 around the articulation 13, all other things being equal, it can be seen that a linear displacement $R\alpha$ of the rack 32 will correspond to an angular displacement $\alpha$ of the arm 2 and will accordingly produce a displacement $R\alpha/2$ of the toothed sector 26, R being the common radius of the three toothed sectors 24–25 and 26. It can be seen from FIG. 3 that the directions of engagement are such that this displacement $R\alpha/2$ of the toothed sector 26 compensates the difference in length of cable which is due to the winding of this latter over the pulley 8, on condition of course, that the pulleys 8 and 27 have the same diameter. The same result would be achieved at the articulation 9 by means of the toothed sector 24 which engages with the rack 29. It can even be observed that, if the member 28b were not to remain parallel with the member 28a, the compensation of the cable would again be ensured in this case.

Figure 4:
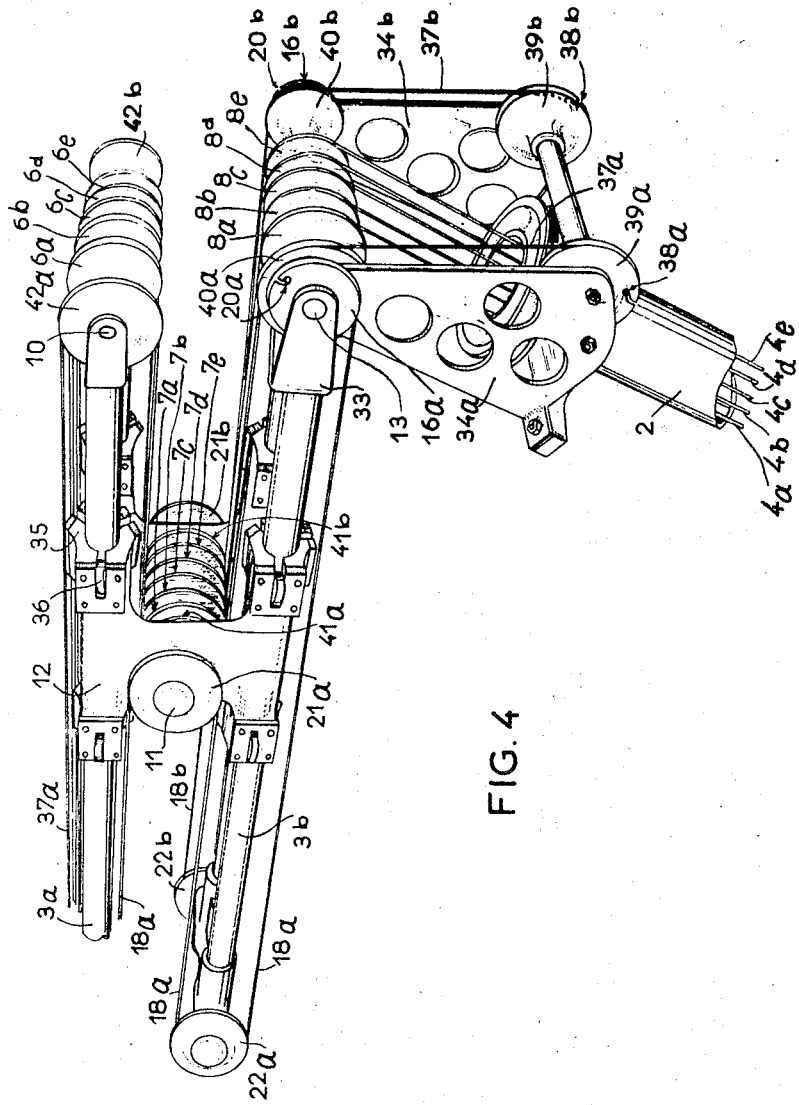
FIG. 4 is a view in isometric perspective of the application of the device for compensation by cables in accordance with the invention to an articulation of a remote handling appliance.

Reference being made to FIG. 4, there will now be described the application of the compensation device in accordance with the invention, and as represented diagrammatically in FIGS. 1 and 2, to a remote handling appliance with cable transmission. There are again shown in the figure the members 3a and 3b which are maintained in parallel relation and at constant distance from each other by the trolley 12, the member 3b being pivotally attached at 13 to the arm 2 by means of the yoke 33 and the members 34a and 34b. It will be assumed that five movements are to be transmitted respectively by the cables 4a, 4b, 4c, 4d, 4e which pass respectively and successively over the pulleys 6a, 6b, 6c, 6d, 6e which are mounted to rotate freely on the axle-pin 10 of the member 3a, over the pulleys 7a, 7b, 7c, 7d, 7e which are mounted to rotate freely on the axle-pin 11 of the trolley 12, and over the pulleys 8a, 8b, 8c, 8d, 8e which are mounted to rotate freely on the pivot-pin of the pulleys 13. The members 3a and 3b are each formed by two cylindrical posts on which are slidably mounted eight bearing frames such as 35 of the trolley 12, said frames being fitted with runner-wheels such as the wheel 36.

The compensation of movement similar to that which is represented in FIG. 2 is effected by two cables 18a and 18b which pass respectively and successively over the pulleys 21a, 21b, 22a, 22b, which are secured to the pulleys 16a and 16b at the points 20a and 20b, said pulleys 16a and 16b being integral with the members 34a and 34b and therefore with the shaft 2. The oppositely-acting compensation system is carried into effect by means of two cables 37a and 37b which are secured at 38a and 38b to the pulleys 39a and 39b which are integral with the members 34a and 34b, said two cables 37a and 37b then being adapted to pass respectively and successively over the pulleys 40a and 40b, 41a and 41b, 42a and 42b. There has been shown in FIG. 4 only one half of the device in accordance with the invention, the other half thereof being readily deduced therefrom according to the diagram of FIGS. 1 and 2.

As will be understood, and as the foregoing description has in any case made apparent, the invention is not limited in any sense to the constructional examples or to the modes of application which have been more especially described and considered but is intended, on the contrary, to include within its scope any and all alternative forms.

What we claim is:

Articulation device providing transmission of movements by cables, belts or chains comprising two members for telescopic movement relative to each other two separate and parallel arms each articulated to one of said members, a trolley associated in translational motion with said members and maintaining said members and said arms in parallel, articulation pins between said two arms respectively and said two members, at least one freely mounted articulation pulley on said pins, each of said two members terminating on at least one freely mounted end pulley, an axle pin on said trolley, idler pulleys mounted for free rotation on said axle pin, the transmission of movement being provided by at least one first cable passing successively over a first of said articulation pulleys, over one of said end pulleys of the first of said members, one of said idler pulleys and a second of said articulation pulleys, compensation being provided by at least one second cable secured to at least one pulley integral with said first arm and mounted on said pin of the first articulation, said second cable passing in a direction opposite to that of said first cable over a pulley mounted on said axle pin of said trolley, over one of said end pulleys of said second member, said second cable being secured to at least one pulley integral with said second arm and mounted on said pin of the second articulation.

References Cited

UNITED STATES PATENTS

| | | |
|---|---|---|
| 616,211 | 12/1898 | Taylor. |
| 628,947 | 7/1899 | Lob _____ 74—501 X |
| 2,816,584 | 12/1957 | Traben _____ 74—501 X |
| 3,010,328 | 11/1961 | Forey _____ 74—110 X |
| 3,146,973 | 9/1964 | Haase _____ 74—96 X |

FOREIGN PATENTS 909,480  12/1945  France.

FRED C. MATTERN, Jr, *Primary Examiner.*

C. F. GREEN, *Assistant Examiner.*